United States Patent
Humphreys

(10) Patent No.: US 11,454,026 B2
(45) Date of Patent: Sep. 27, 2022

(54) LIGHTWEIGHT ROOFING SHINGLE AND METHOD FOR MAKING SAME

(71) Applicant: TAMKO Building Products LLC, Galena, KS (US)

(72) Inventor: David Humphreys, Joplin, MO (US)

(73) Assignee: TAMKO Building Products LLC, Galena, KS (US)

( * ) Notice: Subject to any disclaimer, the term of this patent is extended or adjusted under 35 U.S.C. 154(b) by 419 days.

(21) Appl. No.: 16/546,999

(22) Filed: Aug. 21, 2019

(65) Prior Publication Data

US 2019/0376292 A1    Dec. 12, 2019

Related U.S. Application Data

(63) Continuation of application No. 14/622,847, filed on Feb. 14, 2015, now Pat. No. 10,428,524.

(60) Provisional application No. 61/944,445, filed on Feb. 25, 2014.

(51) Int. Cl.
*E04D 1/26* (2006.01)
*D06N 5/00* (2006.01)
*E04D 1/00* (2006.01)

(52) U.S. Cl.
CPC .............. *E04D 1/26* (2013.01); *D06N 5/00* (2013.01); *E04D 2001/005* (2013.01); *Y10T 156/1062* (2015.01); *Y10T 428/24372* (2015.01)

(58) Field of Classification Search
CPC ...... E04D 1/26; E04D 2001/005; D06N 5/00; Y10T 428/24372; Y10T 156/1062; B32B 2419/06; B32B 2395/00; B32B 2262/0284; B32B 2305/20; B32B 2262/0253; B32B 7/06; B32B 5/022; B32B 2307/712; B32B 2307/748; B32B 3/085; B32B 2037/243; B32B 37/24; B32B 11/10

See application file for complete search history.

(56) References Cited

U.S. PATENT DOCUMENTS

| | | |
|---|---|---|
| 1,456,224 A | 5/1923 | Currier |
| 1,975,584 A | 10/1934 | Leonard, Jr. |
| 2,400,746 A | 5/1946 | Fassiotto et al. |
| 4,848,057 A | 7/1989 | MacDonald et al. |
| 5,195,290 A | 3/1993 | Hulett |
| 5,616,395 A | 4/1997 | Baravian et al. |

(Continued)

FOREIGN PATENT DOCUMENTS

WO    2006080907 A1    8/2006

*Primary Examiner* — Nathan L Van Sell
(74) *Attorney, Agent, or Firm* — Husch Blackwell LLP

(57) ABSTRACT

A lightweight roofing shingle comprising a saturated mat having an exposed side and an unexposed side wherein a fabric reinforcing layer substantially replaces the bottom asphalt coating and the backing aggregate on the unexposed side of a conventional shingle. The lightweight shingle will have a top asphalt layer applied to the exposed side of the mat and a layer of granular material applied to the top asphalt layer opposite the mat per conventional construction, and the fabric reinforcing layer is adhered directly to the unexposed side of the saturated mat. In one embodiment, the fabric reinforcing layer covers an entire area of the unexposed side of the saturated mat. The reinforcing layer may preferably be a nonwoven fabric made from PET or polypropylene. The lightweight roofing shingle may also include a release tape layer applied to the reinforcing layer opposite the saturated mat.

11 Claims, 6 Drawing Sheets

(56) References Cited

U.S. PATENT DOCUMENTS

| | | |
|---|---|---|
| 5,822,943 A | 10/1998 | Frankoski et al. |
| 6,228,785 B1 | 5/2001 | Miller et al. |
| 6,341,462 B2 | 1/2002 | Kiik et al. |
| 6,378,259 B1 | 4/2002 | Carlson |
| 6,426,309 B1 | 7/2002 | Miller et al. |
| 6,436,510 B1 | 8/2002 | Heidel et al. |
| 6,709,994 B2 | 3/2004 | Miller et al. |
| 6,737,369 B2 | 5/2004 | Peng et al. |
| 6,758,019 B2 | 7/2004 | Kalkanoglu et al. |
| 6,851,240 B2 | 2/2005 | Peng et al. |
| 7,048,990 B2 | 5/2006 | Koschitzky |
| 7,118,794 B2 | 10/2006 | Kalkanoglu et al. |
| 7,442,658 B2 | 10/2008 | Rodrigues et al. |
| 7,537,820 B2 | 5/2009 | Kalkanoglu et al. |
| 7,718,558 B2 | 5/2010 | Galvin |
| 7,781,046 B2 | 8/2010 | Kalkanoglu et al. |
| 7,836,654 B2 | 11/2010 | Belt et al. |
| 7,851,051 B2 | 12/2010 | Dejarnette et al. |
| 8,173,243 B2 | 5/2012 | Kalkanoglu et al. |
| 8,181,413 B2 | 5/2012 | Belt et al. |
| 8,226,790 B2 | 7/2012 | Rodriques et al. |
| 2003/0152747 A1 | 8/2003 | Fensel et al. |
| 2003/0165667 A1 | 9/2003 | Decker et al. |
| 2004/0014385 A1 | 1/2004 | Greaves, Jr. et al. |
| 2004/0206035 A1 | 10/2004 | Kandalgaonkar |
| 2006/0228963 A1 | 10/2006 | Souther et al. |
| 2007/0039274 A1 | 2/2007 | Harrington et al. |
| 2008/0248241 A1 | 10/2008 | Kalkanoglu et al. |
| 2010/0005745 A1 | 1/2010 | Harrington, Jr. |
| 2010/0098912 A1 | 4/2010 | Snyder et al. |
| 2010/0105267 A1 | 4/2010 | Scheerlinck et al. |
| 2010/0130080 A1 | 5/2010 | Coninx et al. |
| 2010/0196647 A1 | 8/2010 | Bryson et al. |
| 2010/0330263 A1 | 12/2010 | Teng et al. |
| 2011/0139366 A1 | 6/2011 | Belt et al. |
| 2011/0232220 A1 | 9/2011 | Belt et al. |
| 2012/0047838 A1 | 3/2012 | Kalkanoglu et al. |

LIGHTWEIGHT ROOFING SHINGLE AND METHOD FOR MAKING SAME

CROSS-REFERENCE TO RELATED APPLICATION

This application is a Continuation of U.S. Utility application Ser. No. 14/622,847 filed Feb. 14, 2015 and claims the benefit of U.S. Provisional Patent Application No. 61/944,445 filed Feb. 25, 2014, the entire disclosure of which is hereby incorporated by reference.

FIELD OF THE INVENTION

This present invention relates to an asphalt roofing shingle which is lightweight in comparison to standard asphalt roofing shingles. The reduction in weight results from substantially or completely replacing the layer of asphalt coating and completely replacing the backing aggregate or particles applied to the underside of a conventional asphalt roofing shingle with a fabric, film, release tape or other substrate reinforcing layer. Further, the construction method and final shingle product results in a lower cost but long lived and easier to install shingle.

BACKGROUND OF THE INVENTION

The costs of asphaltic material and other petroleum based products have steadily risen. Current conventional asphalt roofing shingles 500 shown in FIG. 1 include a saturated fiberglass or organic mat 502, a top layer of asphalt coating 504 on the exposed surface 506, a bottom layer of asphalt coating 508 on the unexposed surface 510 of the saturated mat, a surface layer of granular material 512 applied over the top layer asphalt coating 504 on the exposed surface 506 (some of which may be colored), and a layer of fine granular material 514 on the unexposed surface 510 to cover the bottom layer of asphalt coating 508. The layer of granular material 512 on the exposed surface 506 provides the wearing surface of the shingle and a corresponding visual appearance of the shingles. The layer of fine granular material 514, which may include mineral or non-organic aggregate, on the unexposed surface 510 keeps the shingles from sticking together when stacked for packaging and transport.

As the prices of asphaltic material used to coat asphalt shingles and the costs for transporting the manufactured shingles continue to increase, a reduction in the weight of an asphalt roofing shingle due to removal of asphaltic materials provides many useful benefits. Such benefits may include (1) making it more affordable by reducing the amount of non-weathering surface asphaltic material required to produce a shingle, (2) making it more efficient to transport the shingles from the manufacturer to the job site, and (3) making installation easier as crews handle and install the lighter-weight shingles.

Moreover, the fine granular aggregate material used to coat the unexposed surface is expensive, especially when purchased and used in high volume, as in the roofing shingle manufacturing process. Using sand and these other aggregate backing particulates also creates waste as more backing material is applied than necessary to ensure complete coverage of the surface. In addition, the fine particulates in the aggregate, which often include sand, are generally abrasive and penetrate the manufacturing equipment and their abrasive edges cause serious wear and tear to the rollers, drums, gears and other mechanisms associated with the equipment.

As will be appreciated, the repair and replacement of manufacturing equipment is expensive. Further, the use of fine aggregate particulates typically requires use of conventional engineering controls and sometimes personal protective equipment to control both personal exposure to employees and emissions to the environment of silica or other dusts.

Thus, there is a need in the art for lightweight shingles having substantially the same or improved performance characteristics when compared to conventional asphalt shingles. There is a further need in the art to provide a shingle which eliminates the use of the fine aggregates or granular material applied to the back surface to reduce the cost of manufacture and to protect the manufacturing employees from being exposed to the fine aggregate dusts and particulates, while also providing substantially the same or improved performance characteristics when compared to conventional asphalt shingles.

SUMMARY OF THE INVENTION

The present invention is directed toward a lightweight asphalt roofing shingle. The construction of the presently submitted asphalt roofing shingle substantially eliminates the asphalt coating layer and eliminates the application of the fine aggregate/backing particles and replaces these layers with a reinforcing layer. Preferably the reinforcing layer is a fabric, but it could be a film, sheet, or other layer.

An embodiment of the present asphalt shingle includes a saturated mat having an exposed side and an unexposed side, a top asphalt layer applied to the exposed side, and a layer of granular material applied to the top asphalt layer opposite the mat. An embodiment of the present asphalt shingle includes a reinforcing fabric layer adhered directly to the unexposed side of the saturated mat. In one embodiment, the reinforcing layer covers the entire area of the unexposed side of the saturated mat. In another embodiment, a release tape is applied to the reinforcing layer opposite the saturated mat to prevent the shingle from sticking to adjacent shingles during shipping and stacking due to either (1) a line of sealant applied to the exposed surface of the shingle, or (2) a portion of the saturated mat underneath the release layer that remains uncovered by the reinforcing layer. In addition, the reinforcing layer may comprise two portions: a tab portion of said reinforcing layer adhered directly to the unexposed side of the mat below said release tape, and/or a headlap portion of said reinforcing layer adhered directly to the unexposed side of the mat above said release tape.

The reinforcing layer may be adhered to the unexposed side of the mat using a thin layer of adhesive material, or it may be adhered using residual asphalt present due to asphalt bleeding through the saturated mat or residual asphalt remaining after substantially all of a previously applied bottom coating layer is scraped off. The reinforcing layer is preferably a nonwoven fabric. The material of the reinforcing fabric layer is preferably PET or polypropylene; however, any material is within the scope of the present invention.

The present invention also includes a method for making the lightweight roofing shingle comprising the steps of saturating a mat substrate, said mat substrate having an exposed side and an unexposed side, a top and a bottom, applying a top asphalt layer to the exposed side of the mat, applying a layer of granular material to the top asphalt layer opposite the mat; and applying a reinforcing fabric layer directly to the unexposed side of the mat. As mentioned above, embodiments of the method of making the lightweight shingle of the present invention may also include the steps of applying a bottom asphalt layer to the unexposed side of the mat and scraping off the bottom asphalt layer prior to applying the reinforcing fabric layer.

Other aspects and advantages of the present invention will be apparent from the following detailed description of the preferred embodiments and the accompanying drawing figures.

BRIEF DESCRIPTION OF DRAWINGS

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

The present invention relates to a lightweight asphalt roofing shingle which may be applied to residential or commercial structures. The present lightweight asphalt roofing shingle substantially or completely eliminates the coating of asphaltic material and completely eliminates the fine aggregate applied to the unexposed side of the shingle mat and replaces it with a reinforcing fabric layer that is applied to the entire unexposed side of the shingle mat or a portion thereof and/or a release tape layer which may be applied over the reinforcing fabric or directly to the unexposed side of the shingle mat.

The proposed construction provides particular advantages including reduction in the sticking of the shingle web as it travels through the manufacturing process and a reduction in the shingles sticking together in the package and during storage. Further, one purpose of eliminating the backing fines is that it simplifies the tasks of complying with limits on employee exposure to fine aggregate and dust particles, and emissions related to the use of the same into the environment by eliminating the use of the abrasive fine aggregate. This solution is preferred over having to design and implement systems to manage and mitigate exposures and emissions of fine backing aggregate particles using various engineering controls and personal protective equipment. This solution is also beneficial because it reduces material waste due to the over-application of the backing fines, reduces the wear on manufacturing machinery and related maintenance expenses, and makes it easier to clean the workplace.

Figure 1:
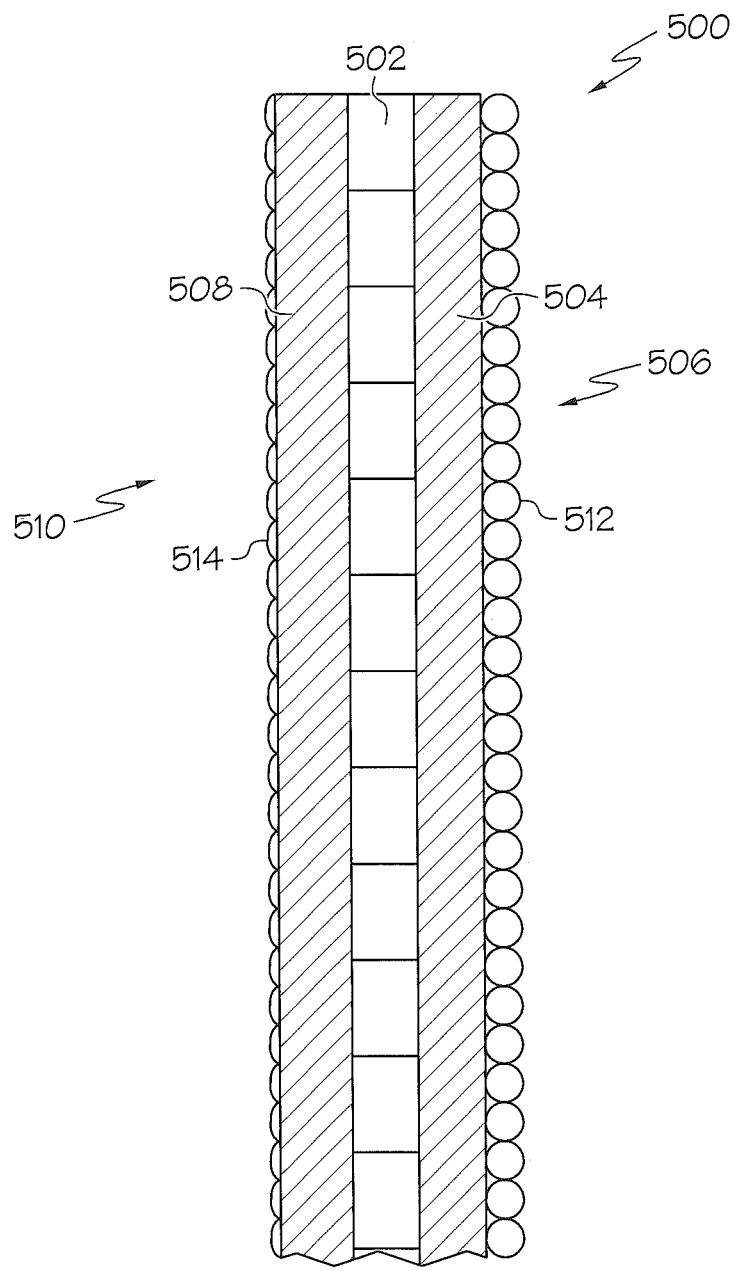
FIG. 1 is a schematic representation of the construction of a conventional asphalt roofing shingle construction as known in the art.
Figure 2:
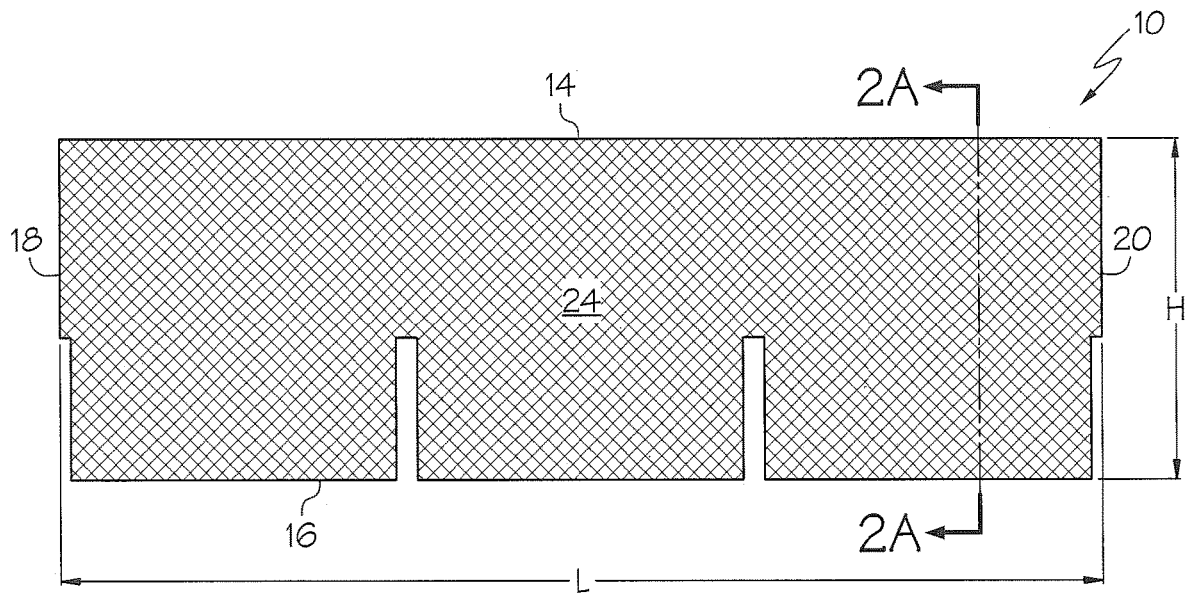
FIG. 2 is a bottom view of an embodiment of a roofing shingle according to the teachings of the present invention.
Figure 2A:
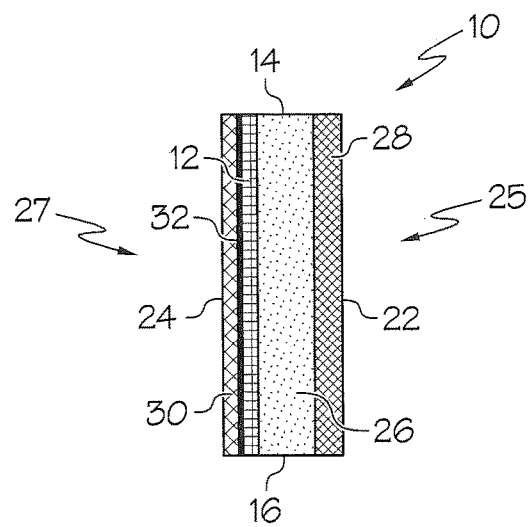
FIG. 2A is a schematic sectional view of the embodiment of the roofing shingle of FIG. 2 cut along the line 2A-2A.

FIGS. 2 and 2A illustrate an embodiment of the present lightweight asphalt roofing shingle 10 comprising a top 14, a bottom 16, a first side 18, a second side 20. Top 14 and bottom 16 define a height H of shingle 10. First side 18 and second side 20 define a length L of shingle 10.

As shown in FIG. 2A, shingle 10 includes an exposed surface 22 and an unexposed surface 24, wherein top 14, bottom 16, first side 18, second side 20 define surfaces 22 and 24 (see FIG. 2). Further, for the purpose of this explanation, FIG. 2A illustrates each layer of shingle 10 can be designated as having an exposed side 25 and an unexposed side 27 when viewed in section. Roofing shingle 10 further comprises a saturated mat 12 having a top layer of asphalt coating 26 generally applied to the entirety of exposed side 25 of saturated mat 12 and a layer of surface granular material 28 applied on the exposed side 25 and over top layer of asphalt coating 26.

Further, roofing shingle 10 comprises a reinforcing fabric layer 30 adhered directly to and covering the entire unexposed side 27 of saturated mat 12. Reinforcing fabric layer 30 may be applied to the entirety of the unexposed side 27 of saturated mat 12 using a thin adhesive layer 32. However, in some embodiments, reinforcing fabric layer 30 will be adhered directly to the saturated mat 12 using residual asphaltic material already present the unexposed side 27 (see FIG. 3A) of saturated mat 12. Reinforcing fabric layer 30 may include a fabric, film, or other substrate which may or may not have a polymer base.

Figure 3:
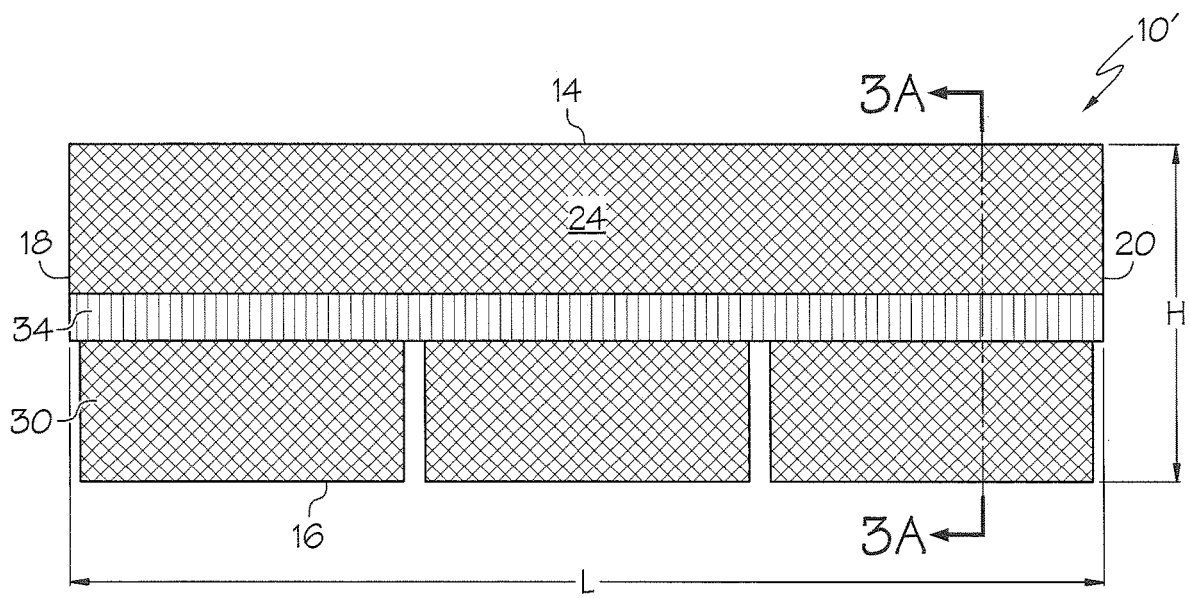
FIG. 3 is a bottom view of another embodiment of a roofing shingle according to the teachings of the present invention.
Figure 3A:
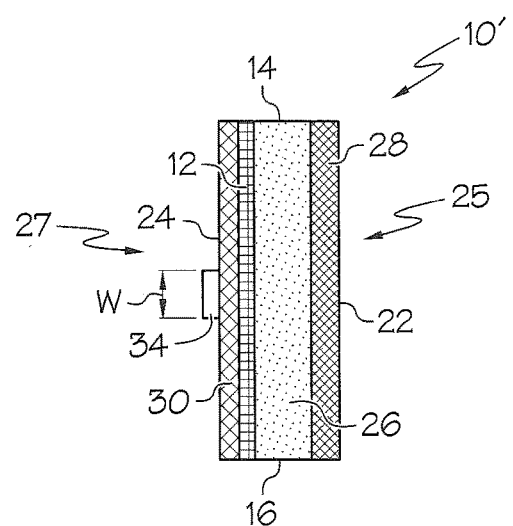
FIG. 3A is a schematic sectional view of the embodiment of the roofing shingle of FIG. 3 cut along the line 3A-3A.

FIGS. 3 and 3A illustrate another embodiment of the present asphalt roofing shingle 10' that is substantially similar to roofing shingle 10 such that, as shown in FIG. 3A, roofing shingle 10' similarly comprises a top layer of asphalt coating 26 generally applied to the entirety of exposed side 25 of saturated mat 12 and a layer of surface granular material 28 applied to the exposed side 25 of top layer of asphalt coating 26 opposite mat 12. As shown in FIG. 3, roofing shingle 10' similarly has top 14, bottom 16, first side 18 and second side 20 that define exposed surface 22 (see FIG. 3A) and unexposed surface 24. Top 14 and bottom 16 define a height H of shingle 10'. First side 18 and second side 20 define a length L of shingle 10'. Again, as shown in FIG. 3A, each layer of shingle 10' can be designated as having an exposed side 25 and an unexposed side 27 when viewed in section.

As shown in FIG. 3A, an embodiment of shingle 10' may include reinforcing fabric layer 30 applied directly to the unexposed side 27 of saturated mat 12 by residual asphalt on the saturated mat. FIG. 3A also shows shingle 10' further comprising a layer of release tape 34 applied on the unexposed side 27 of reinforcing fabric layer 30 opposite mat 12, wherein the layer of release tape 34 is not shown or included in shingle 10 of FIG. 2. Release tape 34 may be positioned in a middle-height area or portion of shingle 10' between top 14 and bottom 16. Release tape 34 may have a width "W" that is less than the height H of shingle 10' and release tape 34 generally extends substantially along the length L of shingle 10'. In one embodiment, the width W of release tape 34 may be in a range between one-sixteenth and one-half (¹⁄₁₆ and ½) the height of the shingle 10'. However, any width W is within the scope of the present invention.

Figure 4:
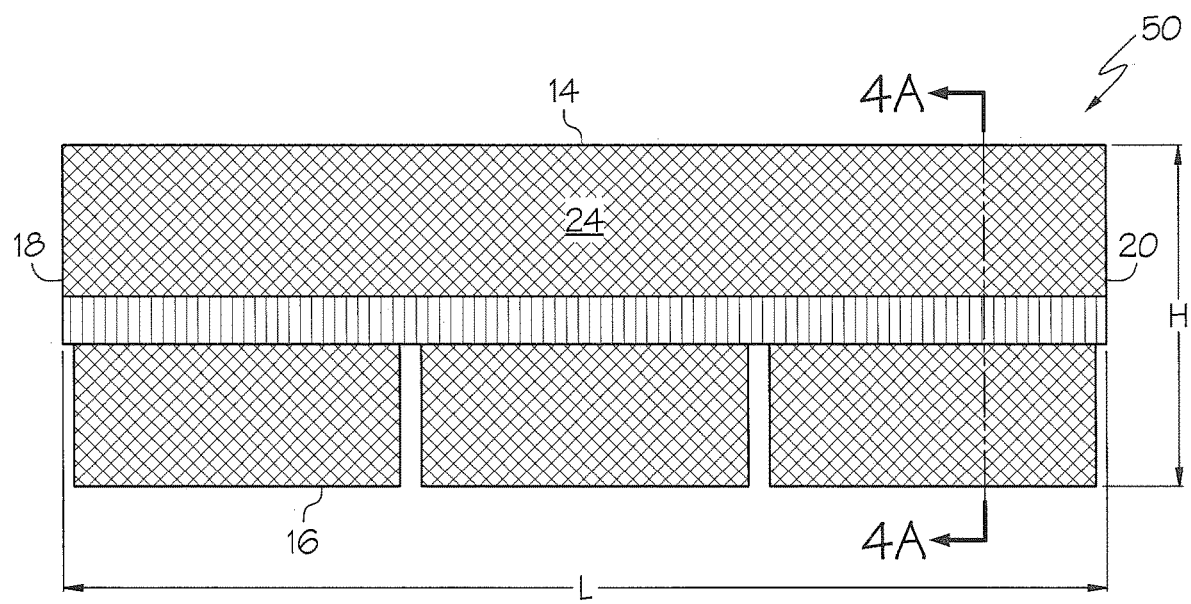
FIG. 4 is a bottom view of another embodiment of a roofing shingle according to the teachings of the present invention.
Figure 4A:
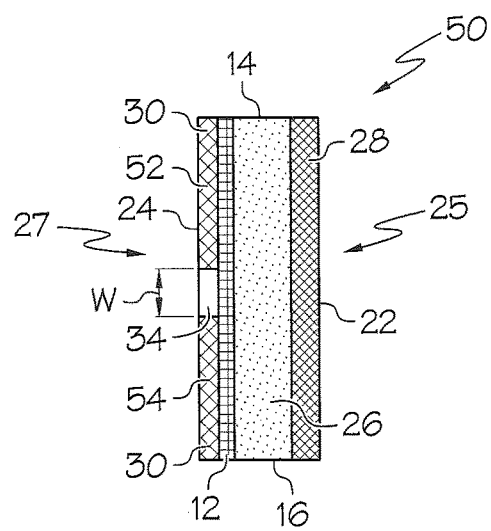
FIG. 4A is schematic sectional view of the embodiment of the roofing shingle of FIG. 4 cut along the line 4A-4A.

FIGS. 4 and 4A illustrate another embodiment of the present asphalt roofing shingle 50 (similar to that shown in FIGS. 3 and 3A) that, as shown in FIG. 4A comprises a top layer of asphalt coating 26 generally applied to the entirety of exposed side 25 of saturated mat 12 and a layer of surface granular material 28 applied to the exposed side 25 of top layer of asphalt coating 26 opposite mat 12. As shown in FIG. 4, roofing shingle 50 similarly has top 14, bottom 16, first side 18 and second side 20 that define exposed surface 22 (see FIG. 4A) and unexposed surface 24. Top 14 and bottom 16 define a height H of shingle 50. First side 18 and second side 20 define a length L of shingle 50. Again, as shown in FIG. 4A, each layer of shingle 50 can be designated as having an exposed side 25 and an unexposed side 27 when viewed in section.

As further shown in FIG. 4A, roofing shingle 50 further includes release tape layer 34 that may be adhered directly to the unexposed side 27 of saturated mat 12 between top 14 and bottom 16 at a mid-height area or portion of saturated mat 12. Further, reinforcing fabric layer 30 comprises a headlap portion 52 adhered directly to the unexposed side 27 of saturated mat 12 above release tape 34 (toward top 14) and a tab portion 54 adhered directly to the unexposed side 27 of saturated mat 12 below release tape 34 (toward bottom 16). When combined with the width "W" of release tape layer 34, headlap portion 52 and tab portion 54 of reinforcing fabric layer 30 substantially cover the entirety of unexposed surface 24 as shown.

Figure 5:
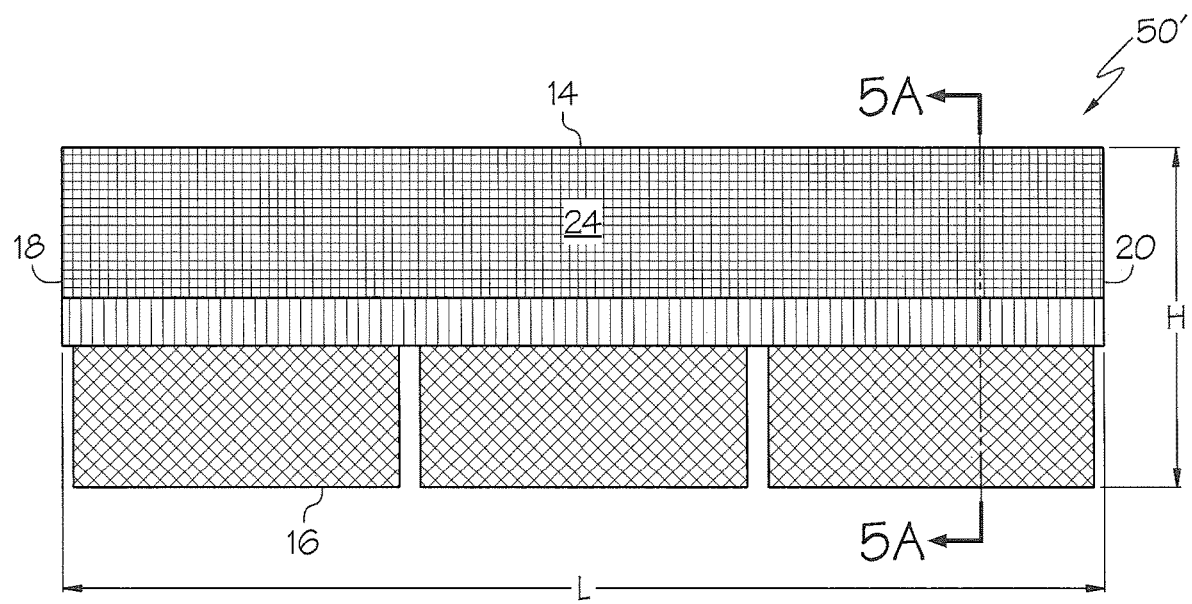
FIG. 5 is a bottom view of another embodiment of a roofing shingle according to the teachings of the present invention.
Figure 5A:
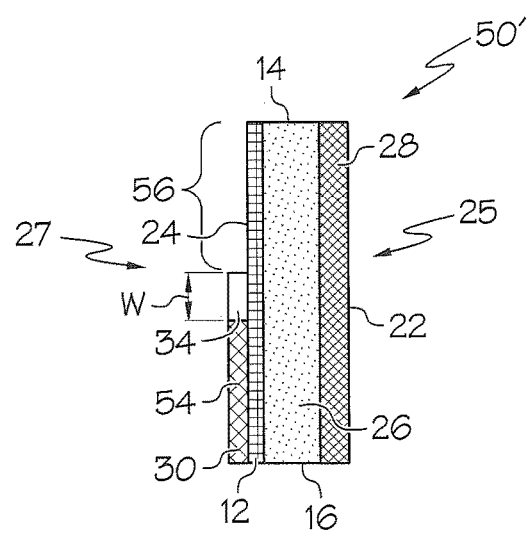
FIG. 5A is schematic sectional view of the embodiment of the roofing shingle of FIG. 5 cut along the line 5A-5A.

FIGS. 5 and 5A illustrate yet another embodiment of the present asphalt shingle 50' similarly configured to asphalt shingle 50 of FIGS. 4 and 4A, wherein, as shown in FIG. 5A, release tape 34 may be adhered directly to the unexposed side 27 of saturated mat 12 between top 14 and bottom 16, but shingle 50' includes only tab portion 54 of fabric layer 30 adhered directly to the unexposed side 27 of saturated mat 12 below (toward bottom 16) release tape 34. As a result, asphalt shingle 50' includes a headlap portion 56 of the unexposed side 27 of mat 12 remaining uncovered.

Figure 6:
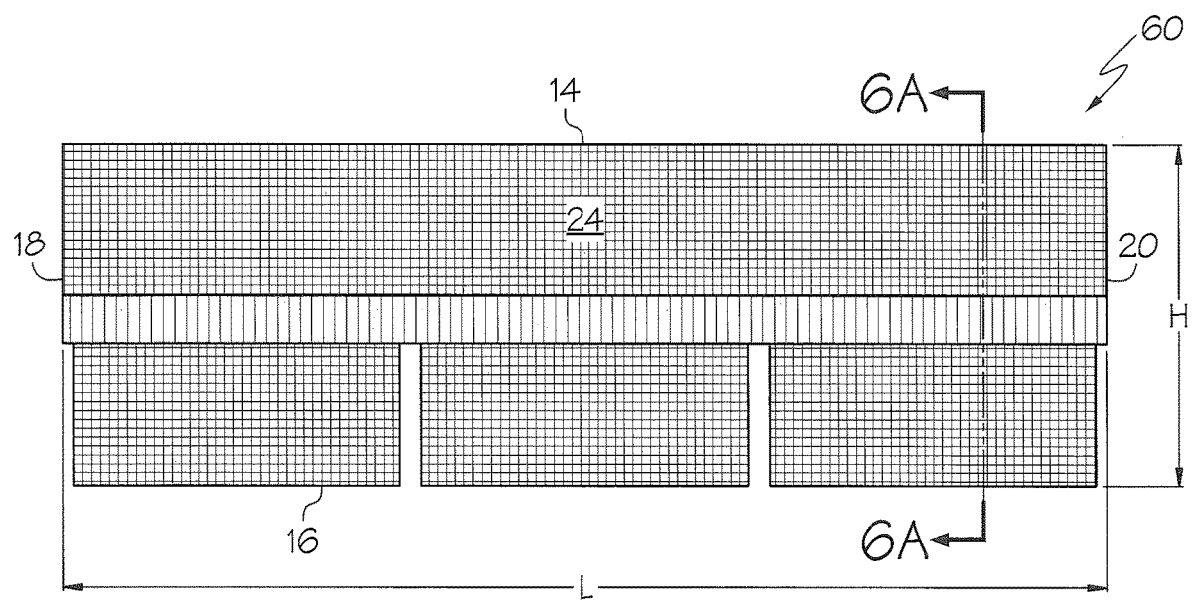
FIG. 6 is a bottom view of another embodiment of a roofing shingle according to the teachings of the present invention.
Figure 6A:
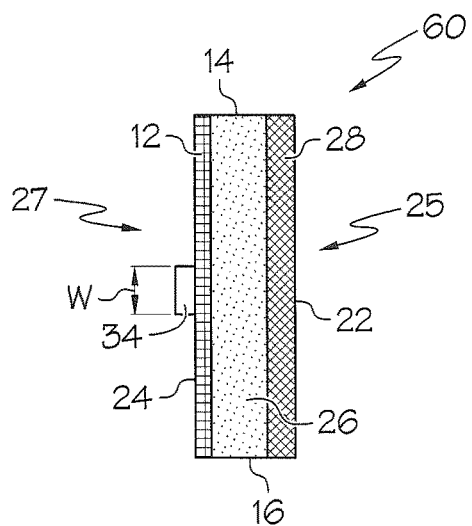
FIG. 6A is schematic sectional view of the embodiment of the roofing shingle of FIG. 6 cut along the line 6A-6A.

FIGS. 6 and 6A illustrates another embodiment of the present lightweight asphalt shingle 60 similar to shingles 10' (FIGS. 3 and 3A) and 50' (FIGS. 5 and 5A) above. Similarly, as shown in FIG. 6, shingle 60 comprises a saturated mat 12 having a top 14, a bottom 16, a first side 18 and a second side 20 that define an exposed surface 22 (see FIG. 5A) and an unexposed surface 24. Top 14 and bottom 16 defines a height H of shingle 60. First side 18 and second side 20 define a length L of shingle 60. Again, as shown in FIG. 6A, each layer of shingle 60 can be designated as having an exposed side 25 and an unexposed side 27 when viewed in section. As shown best in FIG. 6A, shingle 60 differs from shingles 10' and 50' above in that there is no reinforcing fabric layer and only includes release tape layer 34 having a width W being adhered directly to the unexposed side 27 of saturated mat 12 at a mid-height area or portion of the mat 12. However, release tape 34 may be applied at any position along the height of mat 12. As a result, unexposed surface 24 of asphalt shingle 60 remains substantially uncovered.

In any of the above embodiments, a liquid release agent may be applied to the unexposed surface 24 at any time during the manufacturing process to prevent the shingles 60 from adhering during stacking, storage, and transport. Preferably, the application of the liquid release agent occurs after the application of the reinforcing fabric layer 30 and/or the release tape layer 34, but prior to cutting and stacking the shingles.

The specific embodiments described above present several variations as to how the reinforcing fabric layer 30 and release tape 34 may be disposed on the unexposed side 27 of the mat 12 of the present shingle to define the unexposed surface 24 of the shingle. These embodiments are not meant to be limiting, but rather, present a few variations with the recognition that a person of skill in the art may vary the position, extents, orientation, order, or other characteristic of those elements described above within the scope of the present invention. Moreover, the principles and configurations described above may easily be adapted into a specifically designed hip and ridge shingle for use in a roofing system that incorporates the shingle of the present invention.

Saturated mat 12 may be any base mat currently used in the construction of asphalt shingles including, fiberglass, polyester, or organic felt mats, or any other mats now known or hereafter developed for use as an asphalt shingle substrate. Saturated mat 12 may be saturated with asphaltic material prior to being coated with the top layer of asphalt coating 26. Alternatively, saturated mat 12 may have a layer of asphaltic material coated on the exposed side 25 and may further have a layer of asphaltic material applied to the unexposed side 27, wherein a portion of the asphalt coating layer(s) may penetrate or otherwise be adhered to the surfaces of saturated mat 12. Asphalt coating 26 may be any asphaltic material formulation now known or hereafter developed for use to cover asphalt shingles, including asphalt modified with any known additives or performance altering admixtures. Asphalt coating 26 may include aggregate filler added to the asphaltic material and mixed therein to promote adhesion and to increase the creep resistance of the mixture under elevated temperatures experienced on a roof.

Granular material 28 may be any granular material now used or hereafter used for asphalt shingles that at least (1) cover the top layer asphalt coating 26, (2) provide a weathering surface, (3) shield the top layer asphalt coating 26 from UV light when installed on the roof, and/or (4) contribute to the overall appearance and/or color of an asphalt shingle.

Reinforcing fabric layer 30 may preferably be a polyethylene terephthalate (PET) or polypropylene (PP) nonwoven fabric. Polyethylene terephthalate (PET) is commonly known as polyester. In other embodiments, reinforcing fabric layer 30 may be another fabric, film, paper, parchment, foil or other substrate. Further, in a preferred embodiment, reinforcing fabric layer 30 may have a thickness between about 10 and 150 microns (0.01 to 0.15 mm). However, any other thickness of reinforcing fabric layer is within the scope of the present invention. In addition, reinforcing fabric layer 30 may include strands of material that are purposely randomly arranged and then are "point bonded" (embossed or pressed at varying intervals) which fuses the strands together for increased strength. Additional materials from which reinforcing fabric layer 30 may constructed include: polyester fibers, wood pulp, glass fibers, cotton fibers, wool fibers, carpet material, nylon fibers, rayon fibers, acrylic fibers, polyolefin fibers, polypropylene fibers and recycled plastics fibers, recycled paper, binders, and any mixtures or combinations thereof. Reinforcing fabric layer 30 may be woven or unwoven. Reinforcing fabric layer 30 may be a film of polyester, polypropylene, polyethylene, acrylics, other known polymer based films, and other known non-polymer based films.

Release tape 34 may be any type of releasable membrane now known or hereafter developed by a person of skill in the art for keeping a portion of the unexposed portion of the shingle from adhering to a layer of adhesive disposed on the exposed surface of a similar shingle in a shingle stack, and/or keeping a portion of the unexposed portion of the shingle mat that is not covered by a fabric layer from adhering to the exposed surface of a similar shingle in a shingle stack. Such release tape layers and materials are known in the art.

The embodiments of the present shingle described above may be made using the following exemplary method, though other methods are within the scope of the present invention. In one embodiment, mat 12 may be saturated with asphaltic material by submerging mat 12 in asphaltic material or coating mat 12 with asphaltic material as known in the art. Next, the asphalt coating layer may be applied to the saturated mat 12 separately. Alternatively, the asphalt coating layer may be applied simultaneously with the saturating step above. Since the fabric layer is intended to substantially replace the bottom layer of asphalt and completely replace the backing aggregate particulates, the top asphalt layer coating 26 may only be applied to the exposed side 25 of saturated mat 12.

Alternatively, both a top layer coating 26 may be applied to the exposed side 25 and a bottom layer coating (not shown) may be applied to unexposed side 27 of mat 12 using the same equipment currently used to manufacture conventional asphalt shingles. In such instances, wherein both unexposed side 27 and exposed side 25 of saturated mat 12 are initially coated with a coating layer of asphaltic material, the bottom coating layer on the unexposed side 27 may be scraped off prior to applying the fabric layer 30 and/or the release tape layer 34. The scraping process may result in some residual asphalt coating remaining on the unexposed side 27 of saturated mat 12. The scraped asphalt, if any, may be reclaimed and reused in the shingle manufacturing process.

The exposed granular material 28 may then be applied to the exposed side 25 of top asphalt coating 26 opposite the mat 12 using one of the many known processes in the art at any time in the manufacturing process or other similar process developed in the future. If a bottom layer of asphalt is scraped off the unexposed side 27 of mat 12, then the exposed granular material may be applied either before or after the bottom layer is scraped off.

The fabric layer 30 and/or release tape 34 may be applied to the unexposed side 27 of mat 12. If a bottom asphalt coating layer is scraped off or if the mat is saturated with asphaltic material, there will likely be some residual asphalt coating remaining on the unexposed side 27 of saturated mat 12. This residual asphalt coating may be used as an adhesive layer to adhere or bond the reinforcing fabric layer 30 and/or the release tape 34 to the unexposed side 27. Alternatively, an additional adhesive layer 32 (see FIG. 2A) may be applied to the unexposed side 27 of mat 12 to adhere the fabric layer 30 and/or the release tape 34.

Next, the fabric layer 30 and/or the release tape 34 may be adhered directly to the unexposed side 27 of the saturated mat 12 in one of the manners described below. In one embodiment, shingle 10 of FIGS. 2 and 2A includes reinforcing fabric layer 30 being applied to the entire unexposed side 27 of mat 12. In another embodiment, shingle 10' of FIGS. 3 and 3A further includes a layer of release tape 34 being subsequently adhered to the fabric layer 30 at a mid-height position to the shingle 10 of FIGS. 2 and 2A. In another embodiment, shingle 50' of FIGS. 5 and 5A includes a layer of release tape applied directly to the unexposed side 27 of mat 12 proximate a mid-height area or portion of shingle 50' and a tab portion 54 of reinforcing fabric layer 30 is applied directly to the unexposed side 27 of mat 12 below the layer of release tape 34. In yet another embodiment similar to the construction of shingle 50' of FIGS. 5 and 5A, shingle 50 of FIGS. 4 and 4A additionally includes a headlap portion 52 of reinforcing fabric layer 30 being applied directly to the unexposed side 27 of mat 12 above the layer of release tape 24. In another embodiment, shingle 60 of FIGS. 6 and 6A does not include a fabric layer 30, but rather only includes a release tape layer 34 being applied to the unexposed side 27 of mat 12 at a mid-height area or portion. A liquid release agent may be applied to the unexposed surface 24 to prevent the shingles from adhering to the manufacturing equipment or each other when stacked and stored.

In all of the above embodiments, the shingle sheet may be fed through one or more rollers to compress all of the applied layers to improve the adhesion of each of the layers. The above shingle embodiments may also be manufactured substantially on existing manufacturing lines slightly modified to remove the bottom asphalt coating layer and/or to apply the fabric and/or release tape layer.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

I claim:

1. A lightweight roofing shingle comprising:
    a saturated mat having an exposed side and an unexposed side;
    a top asphalt layer applied to the exposed side;
    wherein the unexposed side of the saturated mat does not include a bottom asphalt layer;
    a layer of granular material applied to the top asphalt layer opposite the mat; and
    a fabric reinforcing layer adhered directly to the unexposed side of the saturated mat, wherein the fabric reinforcing layer covers an entire area of the unexposed side of the saturated mat.

2. The lightweight shingle of claim 1 wherein the fabric reinforcing layer is a nonwoven fabric comprising PET.

3. The lightweight shingle of claim 1 wherein the fabric reinforcing layer is a nonwoven fabric comprising polypropylene.

4. The lightweight roofing shingle of claim 1 further comprising a release tape applied to said fabric reinforcing layer opposite the saturated mat.

5. The lightweight roofing shingle of claim 1 further comprising a layer of adhesive material capable to adhere the fabric reinforcing layer to the unexposed side of the saturated mat.

6. The lightweight roofing shingle of claim 1 further comprising the fabric reinforcing layer being adhered to the unexposed side of the saturated mat using a residual amount of a first asphaltic composition saturating the saturated mat.

7. The lightweight roofing shingle of claim 1, where the entire area of the unexposed side of the saturated mat does not include a bottom asphalt coating layer.

8. A lightweight roofing shingle comprising:
- a saturated mat having an exposed side and an unexposed side and being saturated with an asphaltic material;
- a top asphalt coating layer applied to the exposed side;
- wherein the unexposed side of the saturated mat does not include a bottom asphalt coating layer;
- a layer of granular material applied to the top asphalt coating layer opposite the mat; and
- a fabric reinforcing layer adhered directly to the unexposed side of the saturated mat, wherein the fabric reinforcing layer covers an entire area of the unexposed side of the saturated mat.

9. The lightweight roofing shingle of claim 8 further comprising a layer of adhesive material capable to adhere the fabric reinforcing layer to the unexposed side of the saturated mat.

10. The lightweight roofing shingle of claim 8 further comprising:
- the saturated mat being saturated with a first asphaltic composition;
- the top asphalt coating layer having a second asphaltic composition; and
- the fabric reinforcing layer being adhered directly to the unexposed side of the saturated mat using a residual amount of the first asphaltic composition of the saturated mat.

11. The lightweight roofing shingle of claim 8, where the entire area of the unexposed side of the saturated mat does not include a bottom asphalt coating layer.

* * * * *